United States Patent
Morando

(10) Patent No.: US 6,314,682 B2
(45) Date of Patent: *Nov. 13, 2001

(54) PROCESS FOR IMPROVING THE SLIDING QUALITIES OF A CARRIAGE ON A RAIL AND DEVICE FOR IMPLEMENTING THE PROCESS

(75) Inventor: Patrick Morando, Cagnes sur Mer (FR)

(73) Assignee: Mecaplast Sam, Monaco (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,522

(22) Filed: Jun. 12, 1998

(30) Foreign Application Priority Data

Jun. 13, 1997 (FR) .................................................. 97 07325

(51) Int. Cl.⁷ ...................................................... E05D 15/16
(52) U.S. Cl. ................................................. 49/440; 49/404
(58) Field of Search ............................... 49/374, 440, 441, 49/442, 443, 444, 502, 506, 404, 423, 424, 348, 349; 16/88, 89, 93 R

(56) References Cited

U.S. PATENT DOCUMENTS

| | | | |
|---|---|---|---|
| 3,162,281 | * 12/1964 | Kraska et al. | 49/424 |
| 4,648,206 | * 3/1987 | Moriya et al. | 49/374 |
| 4,794,734 | * 1/1989 | Stempien | 49/348 |
| 4,823,511 | * 4/1989 | Herliczek et al. | 49/374 |
| 4,984,332 | * 1/1991 | Bienert et al. | 16/93 R |
| 5,321,911 | * 6/1994 | Dickson | 49/404 |
| 5,613,325 | * 3/1997 | Mariel | 49/374 |
| 5,647,094 | * 7/1997 | Mariel | 16/93 R |
| 5,784,832 | * 7/1998 | LeeVan | 49/348 |
| 5,907,890 | * 6/1999 | Redaelli | 16/96 R |

FOREIGN PATENT DOCUMENTS

| | | |
|---|---|---|
| 3 616 537 | 1/1987 | (DE) . |
| 3743086 | 6/1989 | (DE) . |
| 0 409 095 | 1/1991 | (EP) . |
| 1 304 809 | 8/1962 | (FR) . |
| 2 286 974 | 4/1976 | (FR) . |
| 2 320 459 | 3/1977 | (FR) . |
| 2 575 214 | 6/1986 | (FR) . |
| 838862 | 6/1960 | (GB) . |
| 884 645 | 12/1961 | (GB) . |

* cited by examiner

*Primary Examiner*—Alvin Chin-Shue
*Assistant Examiner*—Curtis A. Cohen
(74) *Attorney, Agent, or Firm*—Nixon & Vanderhye, P.C.

(57) ABSTRACT

A process for improving sliding qualities of a slide contact or carriage on at least one rail, and a device for implementing this process. The carriage includes a part intended to be moved along the rail. A section (4) shaped to conform to the rail is placed on the surface of the rail, closely following the contour thereof and smoothing out irregularities or deformations of the rail.

11 Claims, 2 Drawing Sheets

Figure 1:
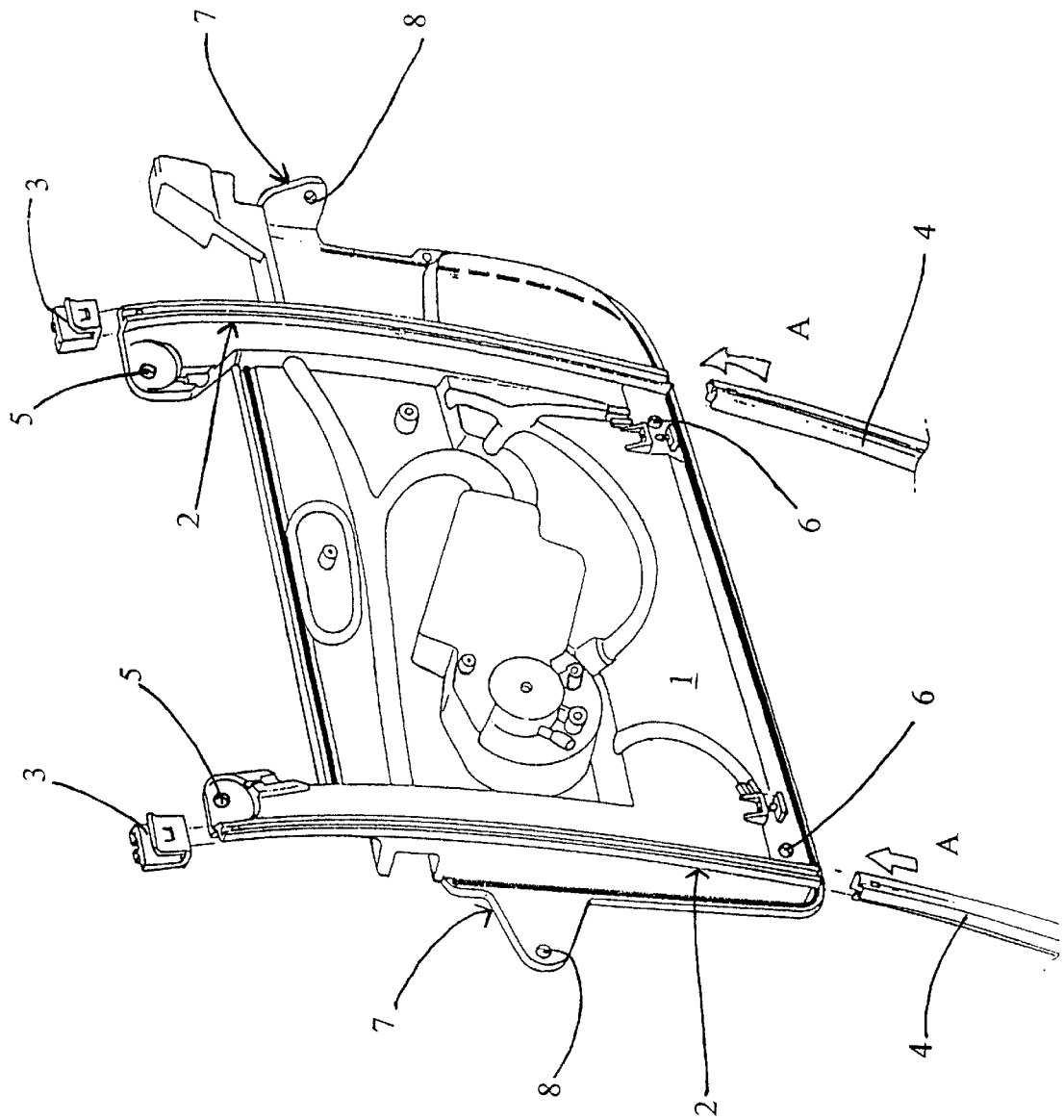

PROCESS FOR IMPROVING THE SLIDING QUALITIES OF A CARRIAGE ON A RAIL AND DEVICE FOR IMPLEMENTING THE PROCESS

This invention relates to a process for improving the sliding qualities of a slide contact or carriage on a rail and a device for implementing the process.

BACKGROUND OF THE INVENTION

The invention can be used in particular to improve the sliding qualities of a window support carriage on a rail of a vehicle door "cassette" such as the one described in the French patent application filed by the applicant on Jan. 24, 1997 with registration number 97 00790.

The slide rails of the window support carriages for vehicle door cassettes can expand under the effect of thermal fluctuations. The deformation of the rails is hindered by the rail attachment screws in the shell of the door of the vehicle, these attachment screws generally being located at both ends of the rails. Thus, as it deforms, the rail can over its length acquire irregularities, in particular in locations hindered by the screws. Consequently, the rail can lose its regular curvature which can cause malfunction in the window crank mechanism; in particular, the window support carriages can become blocked. Moreover, the rail has to be made of a plastic material with good properties of mechanical resistance to stress and strain, good resistance to wear from the sliding of the runners and a good friction coefficient between the material comprising the rail and that comprising the runner. All the above requires the user to mold his rail with a very specific plastic material which is difficult to work with.

SUMMARY OF THE INVENTION

The first object of the invention is a process for improving the sliding qualities of a slide contact or carriage on at least one rail, especially in the case of deformations of the rail caused by thermal fluctuations, alleviating the drawbacks of prior art.

This object is achieved in that to improve the sliding qualities of a slide contact or carriage on at least one rail, the carriage carrying a part intended to be moved along the rail, the process comprises a stage wherein, on the surface of the rail on which the carriage moves a section is installed which has a shape which corresponds to the shape of the rail and a device for implementing the process, the section closely following the contour of the rail and smoothing out irregularities or deformations of the rail due in particular to thermal expansion of the latter.

According to another characteristic the section runs on the rail in a direction parallel to the direction of the rail.

According to another characteristic the section is engaged on the rail in a direction perpendicular to the direction of the rail.

According to another characteristic the section is made part of the rail, but can still move proximate to one of its ends, allowing longitudinal expansion of the section along the rail without affecting the possible shape or curve of the section.

A second object of the invention is a device for implementing the process according to the invention.

This object is achieved in that the device which improves the sliding qualities of a carriage on at least one rail is comprised of a section fastened to the surface of the rail on which the carriage moves, the section having a shape which complements the shape of the rail and closely conforms to the shape of the latter.

According to another characteristic, the section is made a removable part of the rail, proximate to at least one of its ends.

According to another characteristic, the section is composed of plastic material.

According to another characteristic, the section is made part of the rail proximate to one of its ends.

According to another characteristic, there is a section located on the rail(s) of the window crank cassette of the vehicle door.

According to another characteristic, there is a section located on the rail(s) of the window crank system of the vehicle door.

According to another characteristic, the section has a friction coefficient less than the friction coefficient of the rail allowing reduction of loads applied to the carriage to move the latter along the rail.

According to another characteristic, the section is composed of acetal.

According to another characteristic, the rail is composed of polypropylene.

BRIEF DESCRIPTION OF THE DRAWING FIGURES

Figure 2A:
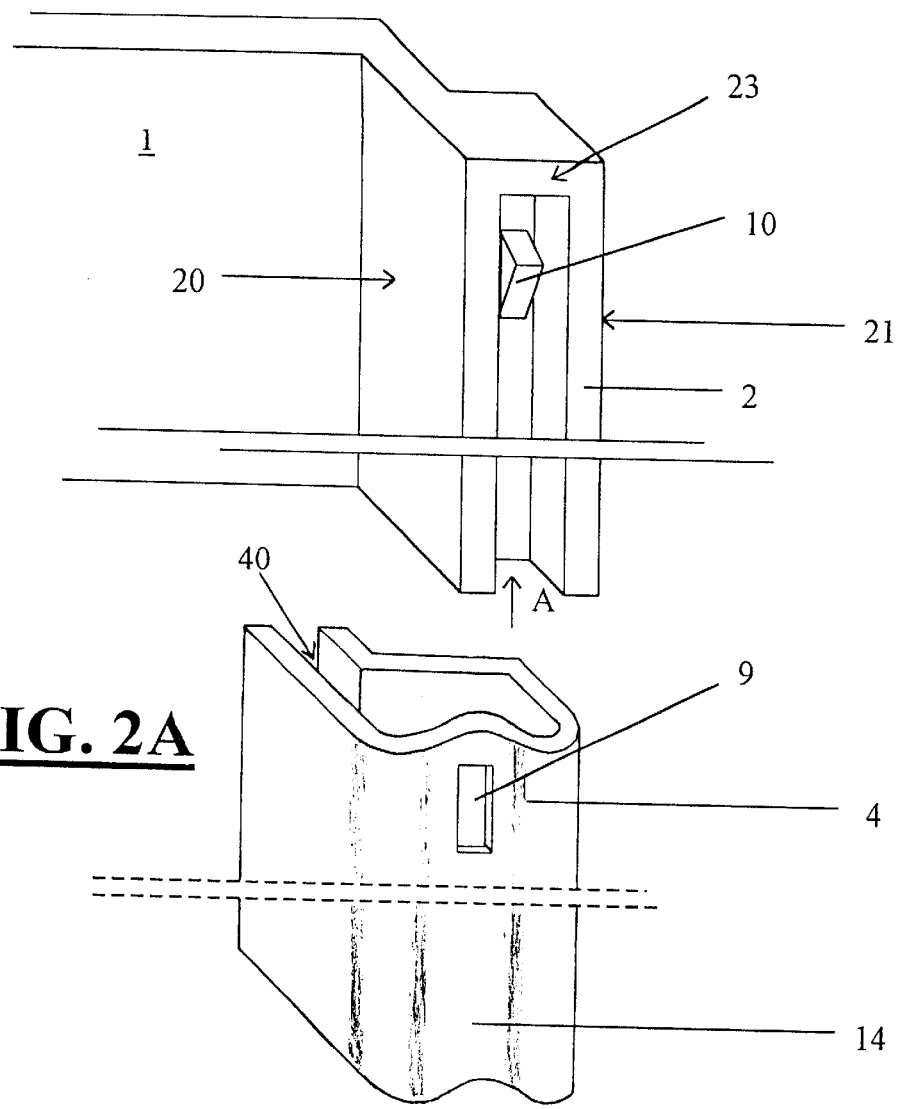
Figure 2B:
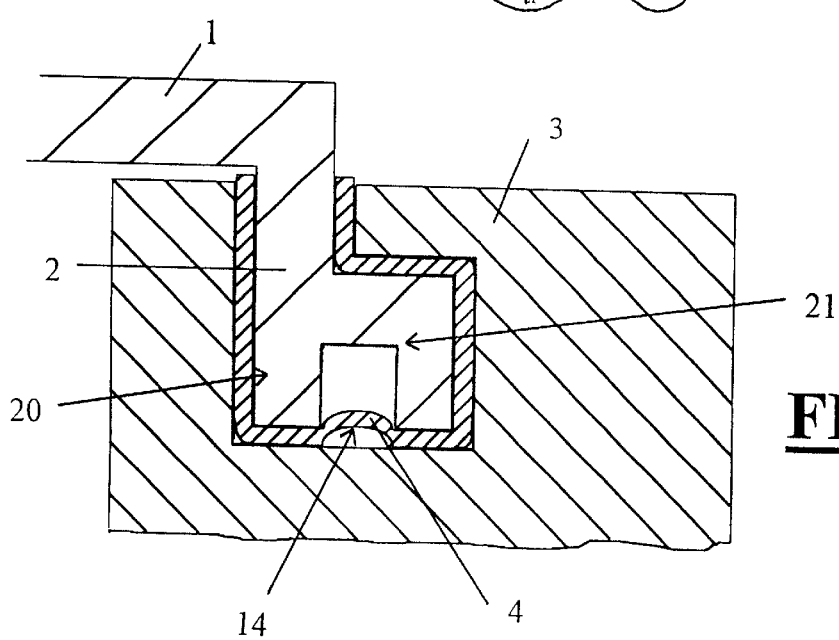

Other characteristics and advantages of this invention will be apparent upon reading the description below with reference to the attached diagrams, wherein:

FIG. 1 shows a simplified overhead view of a vehicle door cassette which is an example of application of the process for improving the sliding qualities of a carriage on a rail as claimed in the invention, FIG. 2A shows an overhead schematic of the rail from FIG. 1 on which there is a section according to the invention which improves the sliding qualities of a carriage, FIG. 2B shows in schematic form and in cross section the sliding rail of FIG. 2A having a section as claimed in the invention and on which a carriage slides.

DETAILED DESCRIPTION OF A PREFERRED EMBODIMENT OF THE INVENTION

The invention will be described with reference to FIGS. 1, 2A and 2B. In the embodiment described below, which is not to be taken as limiting in any way, the invention is applied to sliding of slide contacts or carriages (3) comprising for example the window support of a cassette (1) of the vehicle door. Cassette (1) of FIG. 1 is composed of a roughly rectangular panel which is made of molded plastic. Cassette (1) has, on one of its sides, two vertical rails (2) each projecting beyond the top of cassette (1). on each of these two rails (2) there runs carriage (3) which supports the window and which is adapted to the profile of rail (2). Rails (2) can be molded from a block with cassette (1) or mounted on the latter in any suitable manner. In the latter case, the material used to make the rails can be a metal or plastic material such as polypropylene. Rails (2) can be convex towards the exterior of cassette (1). If the upper extremity of rails (2) should enter the box which forms the frame of the door, there is a perforation (5) proximate to the upper extremity of each of rails (2) for respective fastening of two upper rollers (not shown) of the drive mechanism of carriage (3). In the same way cassette (1) includes, near the lower extremity of each rail (2), perforation (6) designed for fastening of a lower roller of the drive mechanism of carriage (3). On each of its vertical lateral sides, cassette (1) can include at least one tab (7) with perforation (8) for fixing cassette (1) in the box or shell comprising the vehicle door. The upper and lower parts of rails (2) can likewise have perforations for fastening cassette (1) in the vehicle door. As claimed in the invention, to improve the sliding qualities of each carriage (3) on its rail (2), on the surface of rail (2) on which carriage (3) moves there is section (4) which has a shape complementary to the shape of rail (2) and which covers rail (2) on all parts located opposite carriage (3). In cross section rails (2) can have an L, T, Y, U, Z or other shape. In the nonrestrictive example of FIGS. 1, 2A and 2B, rail (2) has a section with roughly the shape of a lower-case h. Leg (20) of the h which comprises the base and the upper part of the h is integral with cassette (1) by one of its two extremities. Second (20) leg of the h composed of rail (2) is formed by a part with roughly the shape of a reverse L. Carriage (3) has a groove with roughly the shape of an L and is designed to accommodate h-shaped rail (2). I.e., carriage (3) does not occupy the space between the two legs of the h formed by rail (2). Section (4) in cross section has a shape which roughly conforms to the contour of the h formed by rail (2). However, section (4) does not strictly follow the surface of rail (2) located between the two legs of the h. Section (4) can be concave towards the space between the two legs of the h formed by rail (2) without actually conforming to this surface located between the two legs of the h. The cross section of section (4) has an opening (40, FIG. 2A) intended for the upper part of the h formed by rail (2). Section (4) can have a length roughly equal to the length of rail (2). Section (4) can advantageously be attached in a movable manner to rail (2). For example, section (4) can run on rail (2) in a direction parallel to the direction of rail (2) and joined to rail (2) proximate to, for example, one of its extremities. Section (4) strictly conforms to the contour of rail (2) and because it is comprised of a piece mounted on rail (2), section (4) smoothes out irregularities and/or deformations of rail (2) caused especially by fabrication or to its thermal expansion. For example, the section can be manually run by an operator by the bottom of rail (2) in direction (A) shown in FIGS. 1 and 2A. Section (4) can be made integral with rail (2) proximate to one of its extremities by engaging. Any other means of joining section (4) to rail (2) is likewise possible. For example, one of the extremities of section (4) can include at least one orifice or recess (9) designed to engage with at least one lug (10) of complementary shape on one extremity of pertinent rail (2). Preferably but not restrictively, lug (10) is formed for example on the surface which is located between the two legs of the h composed of rail (2) and which is perpendicular to these two legs. Complementary orifice or recess (9) is located for its part on concave part (14) of section (4). Advantageously, lug (10) forms a projection large enough to engage in the orifice of section (4) without actually projecting into the way of the two legs of the h formed by rail (2). Thus, lug (10) does not disrupt translational movement of rail (2). Likewise, preferably section (4) engages with rail (2) at the extremity of rail (2). Thus, for example, lug (10) which engages section (4) with rail (2) can be located beyond the farthest position of the stop of carriage (3) on the extremity of rail (2). For example, lug (10) can form a projection of increasing height in direction (A) in which section (4) runs. Advantageously rail (2) can have means which form a stop (23) for section (4), thus limiting the translational movement of section (4) on rail (2) in direction A. These means which form stop (23) are provided to block translational movement of section (4) along rail (2) in direction (A) when section (4) is correctly positioned on rail (2), i.e. when lug (10) of rail (2) engages in recess (9) of section (4). These means which form stop (23) thus prevent sliding of section (4) beyond the extremity of rail (2). These means which form stop (23) for section (4) can be composed for example of a link of material (23) between the two legs (20, 21) of the h formed by rail (2) at the extremity of rail (2) adjacent to lug (10). In this way the extremity of concave part (14) of section (4) adjacent to lug (10) interact when stopped against link of material (23) between two legs (20, 21) of the h formed by rail (2).

Of course the invention is not limited to this embodiment. Thus, one of the extremities of section (4) can include at least one lug intended to interact by engaging with at least one recess of complementary shape on one extremity of pertinent rail (2). Likewise section (4) can be flexible enough to be mounted on rail (2) by an operator in the direction perpendicular to the direction of rail (2). Since section (4) has been made integral with rail (2) by one of its extremities, section (4) will be able to expand lengthwise in the direction of its free end without necessarily changing its shape, the shape of section (4) being determined by the shape of rail (2). For example, under the action of an increase in temperature, section (4) can expand lengthwise several millimeters without disturbing the operation of the window crank by deformation of rail (2). Section (4) can be composed for example of an extruded plastic material. In the preferred nonrestrictive embodiment, section (4) can be composed of acetal which can be easily extruded, with good sliding properties and low cost. Carriage (3) of the window support can likewise be composed of acetal. In one preferred nonrestrictive embodiment, section (4) can have a thickness from roughly 0.8 to 1 mm. Likewise the sliding play between section (4) and carriage (3) which slides on the latter can be for example from roughly 0.05 to 0.15 mm. Likewise, section (4) can have a coefficient of friction less than that of rail (2), thus making it possible to reduce the load which must be applied to carriage (3) to move it along rail (2).

Obviously, a means of improving the sliding quality of a carriage on a rail could be built cheaply, and produced and used easily. Moreover, section (4) protects rail (2) of cassette (1) from the frictional loads generated by carriage (3) and can be very easily replaced in case of wear.

In the embodiment described above, the invention applied to sliding of carriages on rails of a vehicle door cassette. However the invention can likewise be used for sliding of the carriage on rails of a window crank system of a vehicle door or any other system in which a slide contact or carriage slides on a rail.

Other modifications conceivable to one skilled in the art are likewise part of the teaching of the invention. This section (4) can be inserted without necessarily changing the teaching of the invention.

What is claimed is:

1. A process for reducing friction between a carriage and at least one contoured elongated rail on which the carriage slides, the at least one rail having an exterior surface defining its contour, the process comprising the steps of:

placing along the exterior surface of the contoured rail on which the carriage slides a discrete profile shaped in conformance with and closely following the contour of the exterior rail surface, wherein the discrete profile form fittingly engages a portion of the exterior surface of said rail on which the carriage slides so that the carriage surrounds said portion of the exterior surface of the rail and discrete profile when sliding thereon; and securing the profile to the rail at a predetermined location in a manner so as to enable longitudinal expansion of the profile from said predetermined location along and relative to the rail substantially without alteration or change of the contour of the profile whereby thermally responsive irregularities and/or deformations of the rail do not substantially affect the sliding quality of the slider or carriage along the profile when the carriage slides lengthwise along and parallel to the elongated rail.

2. A process according to claim 1 wherein the profile extends along the rail in a direction parallel to the rail.

3. A process according to claim 1 wherein the profile engages the rail in a direction perpendicular to the rail.

4. A window mounting for a vehicle door comprising:

at least one rail for mounting on the vehicle door;

a carriage for sliding movement parallel to and along an exterior contoured surface of the rail and carrying a window; and a discrete profile extending along and form fittingly engages a portion of the exterior surface of the rail on a portion of the rail on which said carriage slides so that the carriage surrounds said portion of the cross section of the rail and discrete profile when sliding thereon, said profile being at least partially located between the rail and the carriage and having a shape complementary to the shape of said rail and closely conforming to the contour of said surface and being secured at a predetermined location therealong enabling longitudinal expansion of said profile from said location along and relative to the rail substantially without change or alteration of the contour of the profile whereby thermally responsive irregularities and/or deformations of the rail do not substantially affect the sliding quality of the carriage along the profile.

5. A device according to claim 4 wherein the profile is secured to said rail adjacent one extremity of said profile.

6. A device according to claim 4 wherein said profile overlies said rail and extends therealong in a direction parallel to the direction of said rail.

7. A device according to claim 4 wherein said profile is comprised of a plastic material.

8. A device according to claim 4 including a window crank cassette for the vehicle door, said rail being mounted on said window crank cassette.

9. A device according to claim 4 wherein a coefficient of friction between the carriage and the profile is less than what a coefficient of friction would have been between the carriage and the rail.

10. A device according to claim 4 wherein said profile is comprised of acetal.

11. A device according to claim 4 wherein said profile is comprised of polypropylene.

* * * * *